(12) United States Patent
Veeramachaneni et al.

(10) Patent No.: US 8,291,067 B2
(45) Date of Patent: Oct. 16, 2012

(54) PROVIDING ACCESS TO PRESENCE INFORMATION USING MULTIPLE PRESENCE OBJECTS

(75) Inventors: Jithendra K. Veeramachaneni, Sammamish, WA (US); Ramesh Manne, Redmond, WA (US); Ramesh K. Vyaghrapuri, Kenmore, WA (US); Nishant V. Dani, Redmond, WA (US); Kitty L. Leung, Redmond, WA (US); Chris G. Parker, Seattle, WA (US); Stephen Gordon, Bellevue, WA (US); Lan Tang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 876 days.

(21) Appl. No.: 11/772,113

(22) Filed: Jun. 29, 2007

(65) Prior Publication Data
US 2009/0006566 A1 Jan. 1, 2009

(51) Int. Cl.
*G06F 15/173* (2006.01)
(52) U.S. Cl. ........................ 709/224; 709/204
(58) Field of Classification Search .................. 709/224, 709/204
See application file for complete search history.

(56) References Cited

U.S. PATENT DOCUMENTS

| | | | |
|---|---|---|---|
| 7,035,865 B2 | 4/2006 | Doss et al. | |
| 7,056,217 B1* | 6/2006 | Pelkey et al. | 463/43 |
| 2002/0035605 A1 | 3/2002 | McDowell et al. | |
| 2003/0037110 A1 | 2/2003 | Yamamoto | |
| 2004/0059781 A1* | 3/2004 | Yoakum et al. | 709/204 |
| 2004/0128391 A1* | 7/2004 | Patzer et al. | 709/228 |
| 2004/0172481 A1 | 9/2004 | Engstrom | |
| 2004/0192440 A1* | 9/2004 | Evans et al. | 463/30 |
| 2005/0026697 A1* | 2/2005 | Balahura et al. | 463/42 |
| 2005/0114676 A1* | 5/2005 | Aggarwal et al. | 713/182 |
| 2005/0210113 A1* | 9/2005 | Kasuga et al. | 709/206 |
| 2005/0216563 A1 | 9/2005 | Stewart et al. | |
| 2005/0239550 A1* | 10/2005 | Hardisty et al. | 463/42 |
| 2006/0031370 A1 | 2/2006 | Lyle et al. | |
| 2006/0195532 A1 | 8/2006 | Zlateff et al. | |
| 2006/0195591 A1* | 8/2006 | Kim et al. | 709/227 |
| 2007/0027921 A1 | 2/2007 | Alvarado et al. | |
| 2007/0124158 A1* | 5/2007 | Kakuta et al. | 705/1 |
| 2007/0239869 A1* | 10/2007 | Raghav et al. | 709/224 |
| 2007/0276909 A1* | 11/2007 | Chavda et al. | 709/204 |
| 2008/0046510 A1* | 2/2008 | Beauchamp et al. | 709/204 |
| 2008/0133674 A1* | 6/2008 | Knauerhase et al. | 709/206 |

(Continued)

OTHER PUBLICATIONS

Eisenstadt, et al., "Instant Messaging+Maps=Powerful Collaboration Tools for Distance Learning", available at least as early as May 9, 2007, at <<http://kmi.open.ac.uk/projects/buddyspace/docs/eisenstadt-komzak-dzbor-teleduc03.doc>>, pp. 12.

Ljungstrand, et al., "Awareness of Presence, Instant Messaging and Webwho", available at least as early as May 9, 2007, at <<http://portal.acm.org/citation.cfm?id=605651>>, SIGGROUP, vol. 21, No. 3, 2000, pp. 21-27.

*Primary Examiner* — Firmin Backer
*Assistant Examiner* — Jonathan Bui
(74) *Attorney, Agent, or Firm* — Lee & Hayes, PLLC

(57) ABSTRACT

An approach is described for maintaining multiple presence objects associated with a single entity. The different presence objects correspond to different respective aspects of the entity's presence. Each presence object includes subscriber information and permission information associated therewith. The subscriber information identifies the subscribers that subscribe to receive notifications for a particular presence object. The permission information identifies the users who are entitled to receive notifications for the particular presence object. By virtue of the use of multiple objects, the entity can control access to its presence information with a high degree of granularity.

20 Claims, 10 Drawing Sheets

U.S. PATENT DOCUMENTS

2008/0140794 A1* 6/2008 Rybak ........................... 709/207
2008/0201419 A1* 8/2008 Hung et al. ................... 709/204
2008/0261630 A1* 10/2008 Wormald et al. ............. 455/466
2008/0263137 A1* 10/2008 Pattison et al. ............... 709/203
2008/0316939 A1* 12/2008 Shimamura et al. .......... 370/254

* cited by examiner

PROVIDING ACCESS TO PRESENCE INFORMATION USING MULTIPLE PRESENCE OBJECTS

BACKGROUND

An instant messaging system operates by sharing presence information among groups of users. For instance, the instant messaging system can communicate the presence-related status of a user to the user's contacts. The presence-related status may inform the contacts that the user is currently online, away, busy, and so forth. The instant messaging system can also convey personal information associated with the user. The personal information may reveal a personalized textual message associated with the user, a personalized display name, and so forth.

An instant messaging system typically manages the dissemination of presence information on an all-or-nothing basis. As shown in FIG. 1, such a system maintains a single collection of presence information 102 associated with a user 104. The single collection describes all aspects of a user's presence within the system. Further, the system maintains a single collection of permission information 106 that describes the users who are entitled to obtain the presence information 102, and a single collection of subscription information 108 that describes users 110 that have subscribed to receive notifications 112 based on the presence information 102. If so permitted by the permission information 102, a subscribing user can receive notifications 112 regarding all aspects of the single collection of presence information 102.

Instant messaging systems of the type described above may have various shortcomings which prevent effective utilization of presence information.

SUMMARY

An approach is described for maintaining multiple presence objects associated with a single entity. The different presence objects correspond to different respective aspects of the entity's presence. Each presence object includes data associated with an aspect of the entity's presence. Each presence object also includes subscriber information and permission information associated therewith. The subscriber information identifies the subscribers that subscribe to receive notifications for a particular presence object. The permission information identifies the users who are entitled to receive notifications for the particular presence object. By virtue of the use of multiple objects, the entity can control access to its presence information with a high degree of granularity, allowing different groups of users the ability to gain access to different respective parts of the presence information.

In one illustrative implementation, a presence-based infrastructure of an instant messaging system is used to manage the dissemination of presence information to users using multiple presence objects. Namely, the presence-based infrastructure can include a publication module for publishing presence information using multiple presence objects. The infrastructure may also include a subscription module for allowing users to selectively subscribe to the presence objects. The infrastructure may also include a notification module for sending presence information to users, in cooperation with the publication module and the subscription module. The infrastructure may also include a query module for allowing users to make queries, which are answered, at least in part, based on the presence information.

In one case, the presence-based infrastructure can provide publication, subscription, notification, and query-based services to instant messaging users in the context of an instant messaging system. In another case, the presence-based infrastructure can optionally cooperate with one or more external application modules. For instance, one or more application modules can supply authorization information and application-specific presence data to the presence-based infrastructure, relying on the presence-based infrastructure to disseminate the presence data to appropriate users.

Figure 1:
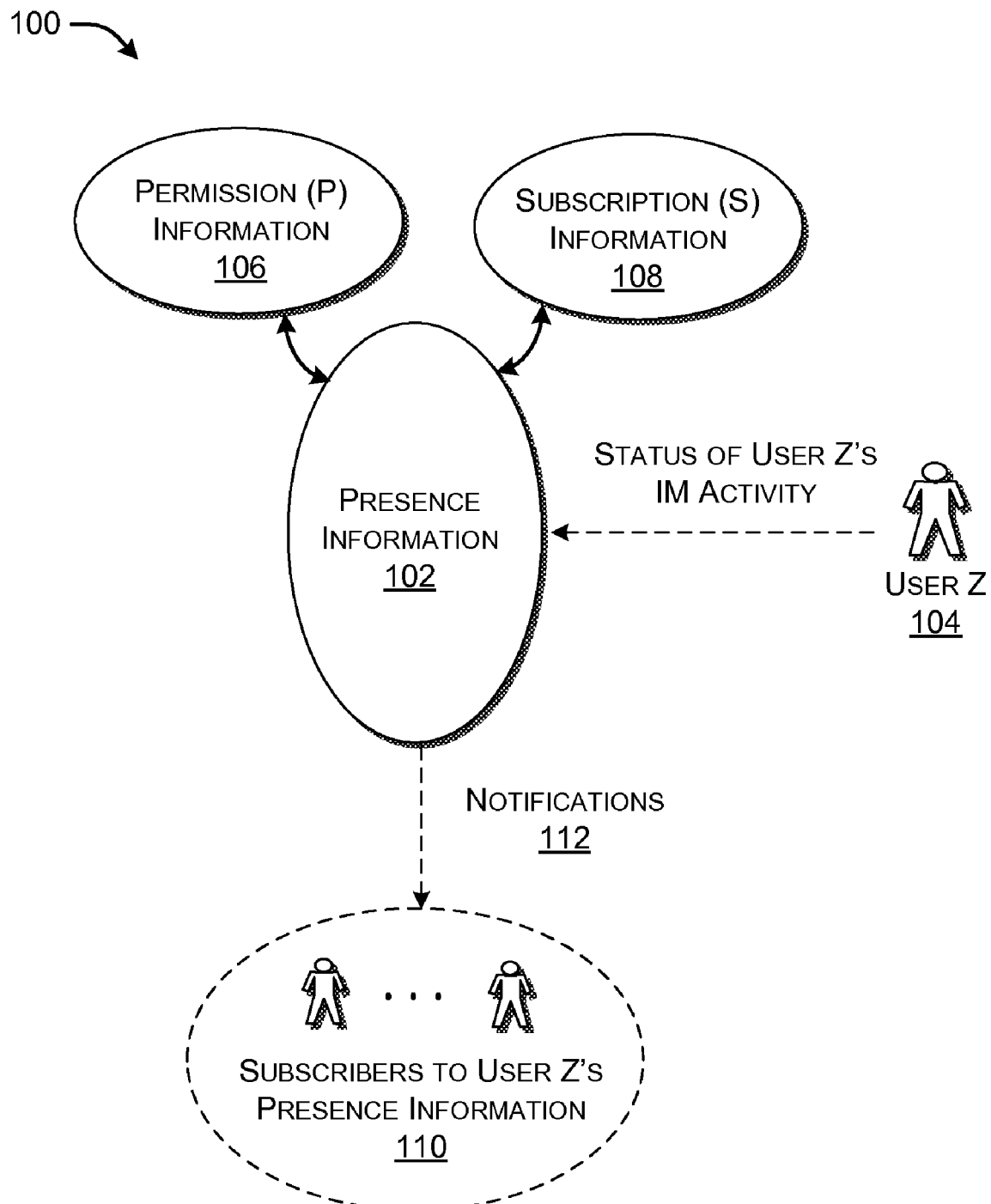
FIG. 1 shows one approach to managing presence information in an instant messaging system.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an illustrative approach for managing presence information on a granular level using a plurality of presence objects. In one case, an instant messaging system can generate notifications based on the use of a plurality of presence objects. One or more external modules can interact with the instant messaging system, thus leveraging the publication and subscription services provided by the instant messaging system.

This disclosure includes the following sections. Section A describes an overview of an illustrative approach to managing presence information using multiple presence objects. Section B describes an illustrative system for implementing the approach of Section A. Section C describes illustrative procedures that explain the operation of the system of Section B. Section C also describes various applications of the system of Section B.

As a preliminary note, any of the functions described with reference to the figures can be implemented using software, firmware, hardware (e.g., fixed logic circuitry), manual processing, or a combination of these implementations. The term "logic, "module," "component," "system" or "functionality" as used herein generally represents software, firmware, hardware, or a combination of the elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

Certain figures describe the approach in flow chart form. In this manner of explanation, certain operations are described as constituting distinct blocks performed in a certain order. Such implementations are illustrative and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

A. Overview of Approach (FIGS. 2A, 2B and 2C)

Figure 2A:
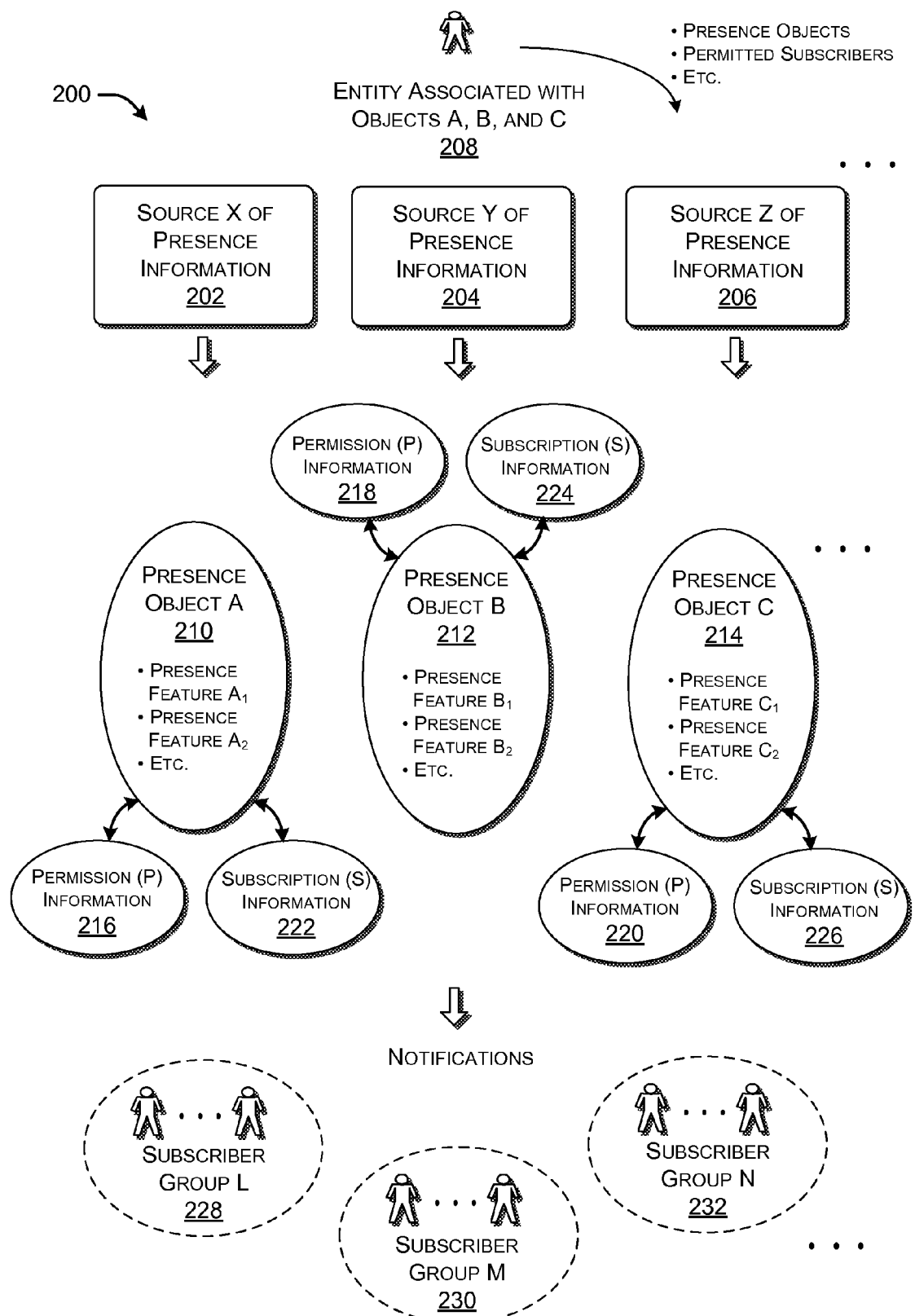
FIG. 2A shows an illustrative approach to managing presence information that relies on multiple presence objects
Figure 2B:
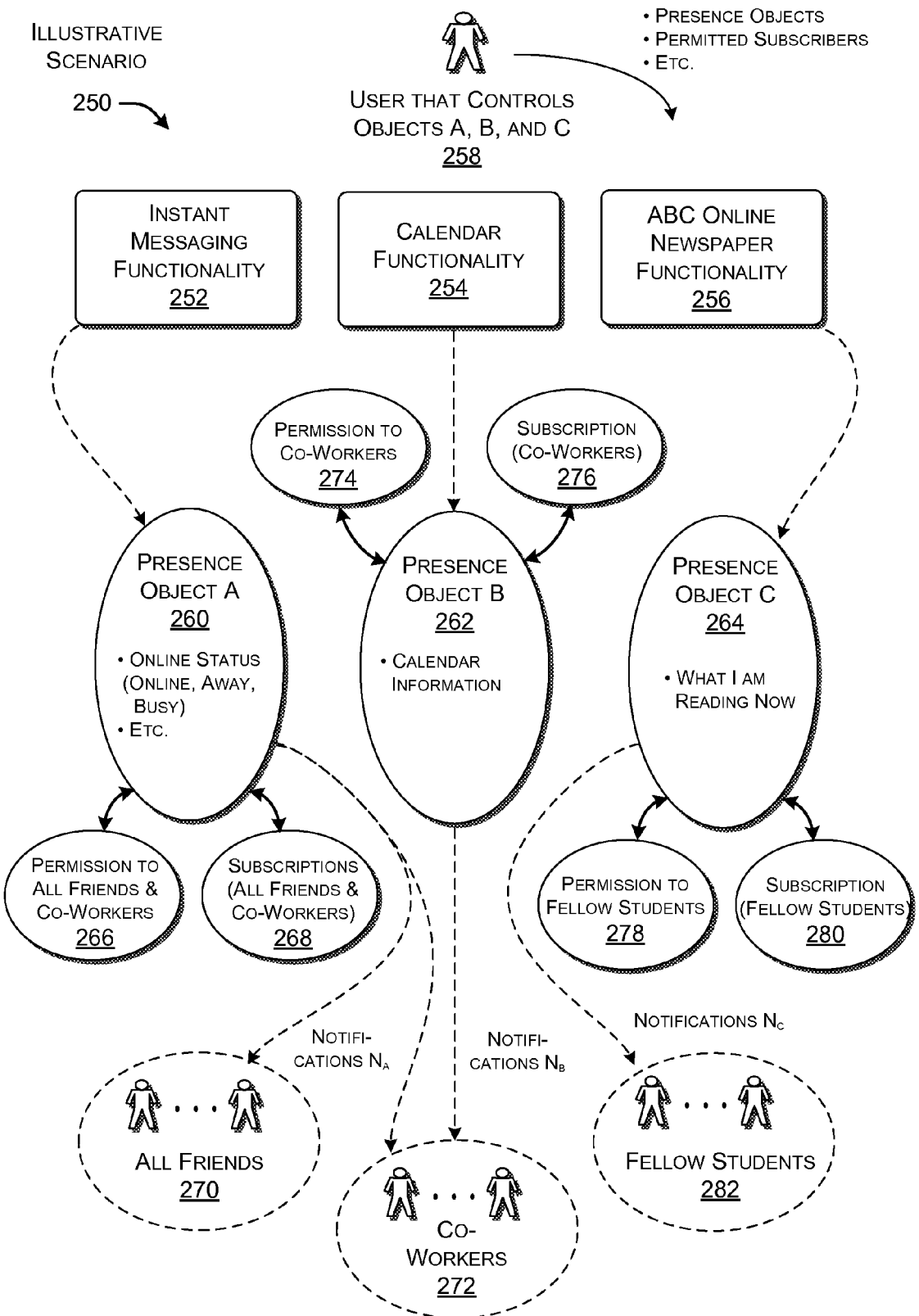
FIG. 2B shows an example of the application of the approach of FIG. 2A.
Figure 2C:
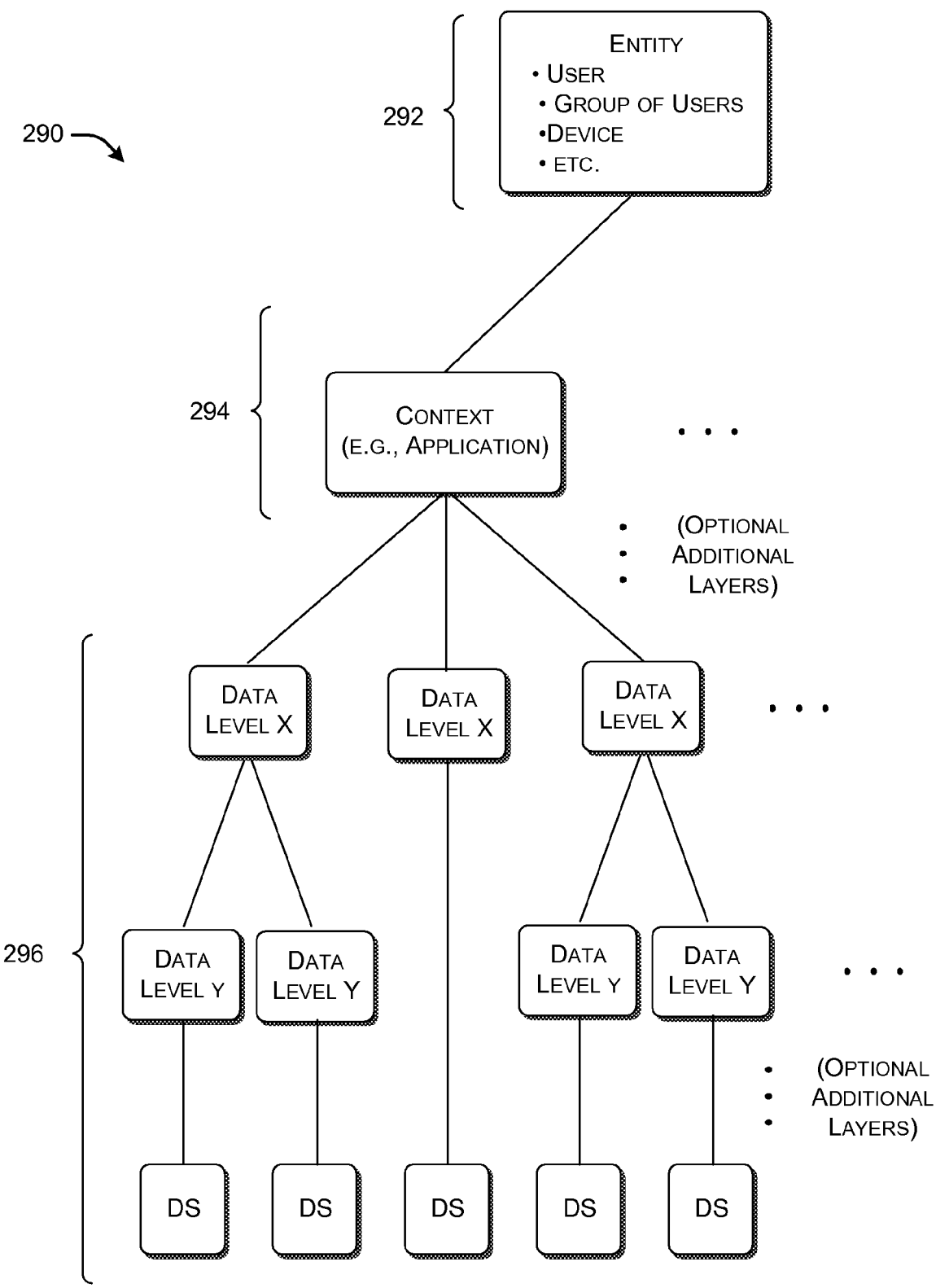
FIG. 2C shows one way of structuring relationships among objects in FIG. 2A.

FIG. 2A is a graphical depiction of one illustrative approach to managing presence data in a system 200. FIG. 2B shows one illustrative application of the approach of FIG. 2A. FIG. 2C shows one illustrative way that the objects and features within FIG. 2A may be hierarchically structured. FIG. 2C also serves as a vehicle for explaining the expansion of the approach of FIG. 2A to other illustrative scenarios. In other words, the system 200 of FIG. 2A is a species of a more general approach, and that more general approach is set forth in the context of FIG. 2C.

The term "presence data" has broad connotation as used herein. The term "presentation data" includes data which generally describes a user's involvement in a data processing environment. Without limitation, such data can describe: the status of the user's interaction with the data processing environment; the nature of the tasks that the user is undertaking within the data processing environment; salient characteristics regarding the user at the time of the user's interaction with the data processing environment; various events that occur in the course of the user's interaction with the data processing environment, and so on. The term "presence information" refers to any part of a body of collected presence data.

The presence data may originate from one or more sources. FIG. 2A graphically represents three of these representative sources: source X 202, source Y 204, and source Z 206. In one illustrative and non-limiting scenario, these sources may correspond to respective application modules within which a user is interacting. The application modules can represent network-accessible services and/or local services provided by user devices.

For example, one application module may correspond to an instant messaging (IM) application. An instant messaging application allows online users to send messages to each other. This type of source may generate presence data that describes the status of a user within the IM application, such as whether the user is currently online, away, busy, and so forth. An IM application can also generate presence data that describes personal information associated with a user (that may be shared with other users with whom the user is communicating). For example, such personal information can include a personalized message, a personalized display name, and so on. An IM application can generate yet other types of presence data.

Another application module may correspond to a social network application. One such social network application may correspond to a network-accessible service that allows users to share personal information with each other, such as profile information, photos, blogs, etc. This type of source may generate presence data that corresponds to any of the personal information provided by the application.

Another application module may correspond to a game application. This type of source may generate presence data that describes salient characteristics regarding a user's game play, such as the name of the game that the user is playing, the identities of the player(s), the user's current score, significant events that occur in the course of game play, and so forth.

Another application module may correspond to a media consumption application. This type of source may generate presence data that that describes the media content that the user is currently consuming. For instance, a music player source may generate presence data that describes a song that the user is currently listening to. A network-accessible newspaper or journal source may generate presence data that describes an article that the user is currently reading, and so on.

Another application module may correspond to a dating-related application. This type of source can generate presence data that describes personal information maintained by users and/or events that occur in the course of using the dating-related application.

Another application module may correspond to a calendar application. This type of source can generate presence data that describes information in a user's calendar.

Another application module may correspond to any type of application which can provide the geographical location of the user, such as a mobile telephone application, a GPS-type application, and so forth. This type of source can generate presence data that describes the user's current geographic location.

Still other types of application modules can be used to provide presence data.

In one case, presence data exists within the system 200 only when a condition (or state) that the data describes prevails within the system 200. For example, presence data that identifies a user as being online may exist within the system 200 only when the user is actually online. In another case, the presence data can be maintained by the system 200 even though the user is not currently engaged with the system 200. For example, presence data can be maintained which indicates a user's top game score, even though the user may not be presently playing a game or even logged into the system 200.

One or more triggering events can cause the publication or dissemination of presence data. A first type of event corresponds to a change in any of the presence data. For example, a publication event may correspond to a change in the user's IM status, a change in the information presented in a user's social network page, a change in the media being consumed by the user, a change in the status or course of a game being played by the user, a change in the user's calendar, a change in the location of the user, and so forth. A second type of event may correspond to an alert generated by any application module for any reason. A third type of publication event may correspond to a user's on-demand request for presence data. For example, a user may receive presence data by making a targeted request for such data in the form of a query. The first and second types of publication events correspond to push-type events, e.g., in which notifications are independently forwarded to users. The third type of dissemination event corresponds to a pull event, e.g., in the sense that the user initiates the retrieval of presence data.

In the approach shown in FIG. 2A, an entity 208 can use a plurality of presence objects to disseminate presence data to users in the form of notifications. The entity 208 can correspond to any agent that has a role in controlling one or more aspects of the presence objects, such as by creating the presence objects and/or administering the presence objects (e.g., by supplying information to the presence objects). In one case, the entity 208 may correspond to a human user who defines various presence objects, and, in a sense, "owns" these objects. In another case, the entity 208 can correspond to a group of users. In another case, the entity 208 can correspond to a device, an application module, a system, an organization, or any other type of functionality or construct. FIG. 2C provides additional information regarding various implementations and interpretations of the entity 208.

FIG. 2A shows three representative presence objects (210, 212, 214), although the entity 208 can define fewer or additional presence objects. Each presence object serves as a vehicle for publishing different respective collections of presence data to authorized users. Namely, each presence object receives presence data from one or more sources (202, 204, 206). Based on permission information and subscription information (to be described below), each presence object conveys the presence data to a group of authorized users via notifications. For example, assume that the entity 208 corresponds to a human user who has a set of contacts. Further assume that the user's contacts include multiple groups. The user may decide that a first set of presence data is appropriate to expose to a first group of contacts, but the user does not wish to expose other presence data to this group. The user may decide that a second set of presence data is appropriate to expose to a second group of contacts, but the user does not wish to expose other presence data to this group, and so forth. To achieve this selective distribution of presence data, the user can allocate a first presence object to administer distribution of the first set of presence data, a second presence object to administer distribution of a second set of presence data, and so on. By virtue of the use of plural presence objects, the user can grant access to his or her presence data on a more granular level than an all-or-nothing approach (although the multiple presence object framework also allows the user to grant access on an all-or-nothing approach by adopting a single presence object).

The above-described approach may be useful from the perspective of the entity 208 by restricting the publication of personal data to appropriate recipients (rather than the entire set of the user's contacts). The approach may also be useful from the standpoint of the recipients by preventing the recipients from receiving presence that that is not relevant to their interests. Further, in certain cases, the approach can prevent the dissemination of presence data to recipients that are not even capable of receiving and/or processing the presence data.

Each presence object can include permission information associated therewith. For example, presence object 210 includes permission information 216 associated therewith, presence object 212 includes permission information 218 associated therewith, and presence object 214 includes permission information 220 associated therewith. The permission information identifies, for a particular presence object, the recipients who are entitled to receive presence information associated with the particular presence object. In general, the permission information can be expressed in positive terms (by identifying entities that are permitted to access the presence data), in negative terms (by identifying entities that are forbidden to access the presence data), or by a combination of positive and negative terms. In one case, the permission information can identify entities by any kind of information associated with the respective entities, e.g., corresponding to one or more codes, names, etc. associated with the entities. The permission information can optionally include timing information that defines a time period for which the permission information remains valid. More specifically, in one case, the permission information can be maintained by one or more access control lists (ACLs) associated with the presence object. In another case, the permission information can be administered on a more temporary basis by granting authorization tickets to an entity that entitles the entity to perform prescribed tasks in certain circumstances. As described above, the permission information can include read-type permission information which identifies what entities are entitled to obtain (read) data from a presence object. The permission information can also include write-type permission information which identifies what entities are entitled to supply data to a presence object.

Each presence object can include subscription information associated therewith. For example, presence object 210 includes subscription information 222 associated therewith, presence object 212 includes subscription information 224 associated therewith, and presence object 214 includes subscription information 226 associated therewith. The subscription information identifies, for a particular presence object, the entities (subscribers) that have subscribed to receive notifications generated based on the presence object. In one case, a user (or other entity) may subscribe to receive notifications generated by a presence object through an appropriate set-up procedure. For example, a user can identify that he or she wishes to receive IM presence data that conveys the presence of entity 208. FIG. 2A shows three representative groups of subscribers, namely subscriber group 228, subscriber group 230, and subscriber group 232. Additional or fewer subscription groups may exist in a particular environment. The subscription information can optionally include timing information that defines a time period for which the subscription information remains valid.

FIG. 2C will provide additional details regarding the manner in which permission information and subscription information can be associated with a presence object. At this point, suffice it to say that, in one scenario, the permission information and subscription information may be directly associated with a presence object. In another scenario, the permission information and subscription information can be associated with another object in the system 200, and the permission information and the subscription information apply to a particular presence object (and possible other objects) by virtue of inheritance.

In operation, as will be described in greater detail below, a source in the system 200 can forward presence data upon the occurrence of a publication event. As set forth above, in one case, a publication event may occur in response to a change in the presence of the entity 208 (in the context of an application associated with the source). A presence-based infrastructure associated with the presence objects (210, 212, 214) receives the presence data in response to the publication event and stores the presence data in one or more presence objects, but to simplify the explanation, assume that the presence data is forwarded to a single presence object. The infrastructure can then consult the subscription information associated with the presence object to determine the recipients that should be notified of the presence data. The infrastructure can consult the permission information associated with the presence object to determine what recipients are entitled to receive the presence data. Based on the subscription information and presence information, the infrastructure can then send notifications to one or more appropriate recipients. Since the presence data is reported via a narrowly targeted presence object, the system 200 makes it more likely that only appropriate recipients receive notifications.

More specifically, consider a first case in which the presence-based infrastructure receives initial data that will be used to populate a new presence object. In response, the presence-based infrastructure will create the presence object. The presence-based infrastructure can then send a subscriber a full set of presence data associated with this new presence object. Subsequently, a source associated with the presence object may send updates to the presence object, e.g., either in the form of a full set of presence data or only part of the full set of presence data (e.g., corresponding to the part of the presence data that has changed). The latter updating approach is an incremental approach because it changes the presence data maintained by the presence-based infrastructure in increments. In similar fashion, the presence-based infrastructure can respond to the receipt of updated presence data by sending either a full set of presence data to a subscriber or only part of the presence data. Again, the latter updating approach is an incremental approach because it supplies the presence data to a subscriber in increments (e.g., corresponding to data that has changed).

FIG. 2B describes the concepts set forth with respect to FIG. 2A in terms of a specific scenario. This scenario is presented for illustration purposes only and should not be construed as limiting the manner in which the principles set forth herein can be applied.

In this scenario, a system 250 includes three publication sources. A first source corresponds to an instant messaging application 252. The instant messaging application 252 allows communication participants to engage in real-time communication while online. A second source corresponds to a calendar application 254. The calendar application 254 maintains calendar information for one or more users. A third source corresponds to a network-accessible media consumption application 256. The network-accessible media consumption application 256 allows one or more users to access and read an online periodical, such as an online newspaper. Additional or fewer sources of presence data can be used. The assortment of specific sources illustrated in FIG. 2A is merely representative.

In this scenario, a user 258 has established three presence objects (260, 262, 264). The first presence object 260 is used to publish IM-related information obtained from the instant messaging application 252. The presence data obtained from this source includes, without limitation, online status information, personal message information, and so forth. The first presence object 260 includes permission information 266 and subscription information 268. The permission information 266 and subscription information 268 enable notifications to be sent to two subscriber groups (270, 272). A first subscriber group corresponds to the user's 258 friends. A second subscriber group 272 corresponds to the user's 258 co-workers. These two subscriber groups (270, 272) receive notifications when a publication event occurs within the IM application 252.

The second presence object 262 is used to publish calendar-related information obtained from the calendar application 254. The presence data obtained from this source includes, without limitation, information regarding the schedule of the user 258. The second presence object 262 includes permission information 274 and subscription information 276. The permission information 274 and subscription information 276 enable notifications to be sent to the second subscriber group 272, which corresponds to the user's 258 co-workers. The second subscriber group 272 receives notifications when a publication event occurs within the calendar application 254, such as when the user's 258 schedule changes.

The third presence object 264 is used to publish media-related information obtained from the media consumption application 256. The presence data obtained from this source includes, without limitation, information regarding a newspaper article and the like that the user 258 is currently consuming. The third presence object 264 includes permission information 278 and subscription information 280. The permission information 278 and subscription information 280 enable notifications to be sent to a third subscriber group 282, which corresponds to the user's 258 fellow students. The third subscriber group 282 receives notifications when a publication event occurs within the media consumption application 256, such as when the user 258 advances within a newspaper to read a new article, when the user enters a comment related to a particular article, and so on.

In general, multiple sources can feed presence data to one or more presence objects. For example, although not shown, the IM application can feed IM-related presence data to both the first and second presence objects (260, 262). This means that the user can expose a first set of IM presence data to a first group of subscribers and another set of IM presence data to a second group of subscribers, and so on. Further, a presence object can serve one or more subscriber groups. For example, the presence object 260 can provide notifications to subscriber group 270 and subscriber group 272. Further, a subscriber group can subscribe to one or more presence objects. For example, the co-worker subscriber group 272 subscribes to both the first presence object 260 and the second presence object 262. As explained above, write-type permission information governs what entities are allowed to write presence data to presence objects.

In addition to push-type notifications (in which the system 250 sends notifications to subscribers upon the occurrence of publication events and alerts), the system 250 can allow any user to make a query. The system 250 can answer the query based on, at least in part, the presence data collected by one or more sources. For example, the system 272 can allow any one of the user's 258 co-workers (in subscriber group 272) to inquire as to what other users are currently online and planning to attend a certain event. In answering this query, the system 200 can rely, at least in part, on information maintained by the IM application 252 and the calendar application 254. This mode of obtaining presence data uses a pull-based technique. The system 258 can process such queries in a manner more fully described in the next section.

FIG. 2C describes one way that the various objects and features shown in FIGS. 2A and 2B can be structured. FIG. 2C also serves as a vehicle for explaining the expansion of the approach of FIGS. 2A and 2B to other illustrative scenarios.

FIG. 2C shows an organization of objects and features into a hierarchical structure 290 including a plurality of tiers. The hierarchy 290 can be implemented as a data structure stored on one or more machine-readable media.

An entity serves as a first tier 292, or root node. The entity may correspond to the entity 208 of FIG. 2A. This entity can generally correspond to any agent that has a role in controlling one or more aspects of the presence objects. In one case, the entity may correspond to a human user who defines various presence objects, and, in a sense, "owns" these objects. In other cases, the entity can correspond to a group of users, a device, a functional module, a system, an organization, etc. In terms of a data structure implementation, the entity may correspond to a collection of identifying data which represents the entity.

A second tier 294 corresponds to one or more contexts associated with the entity's presence data. For the case in which the entity is a user, the different contexts of presence data can correspond to different applications (e.g., as in the example of FIG. 2B). For the case in which the entity corresponds to a group of users, the different contexts of presence data can correspond to activities or rosters. For the case in which the entity is a device, the different contexts of presence data can correspond to applications. For an institutional entity, the different contexts of presence data can correspond to parts of the institution, and so on. These examples are illustrative and are not intended to present a closed set of possible interpretations of the "entity" and "context" features of FIG. 2C. Further, FIG. 2C shows that the context tier 294 includes a single layer, but the context tier 294 can include two or more component layers.

A third tier 296 is a data tier of the hierarchical structure 290. Generally, the data tier 296 manages presence data in the form of presence objects and various collections of presence objects. For instance, the third tier 296 shows various DS nodes which may correspond to respective presence objects. One or more other component layers in the data tier 296 can organize the presence objects in various collections (or collections of collections, and so on).

Information (and other features) can be associated with different nodes in the hierarchy 290. The information will then apply to the node it is directly associated with as well as the nodes which depend (either directly or indirectly) from this node (e.g., encompassing child nodes, child of child nodes, etc.). For example, permission information and/or subscription information can be applied to a node in the context tier 294, which may correspond to a particular application. This permission information and/or subscription information will then apply to all presence objects associated with that particular application.

Further, operations directed to a particular node can invoke actions performed with respect to that node and its progeny nodes. For example, a user can direct a query to a particular node in the hierarchy 290. The presence-based system can rely on all presence data encompassed by that node in the hierarchy 290 to answer the query.

B. Illustrative System (FIGS. 3-7)

Figure 3:
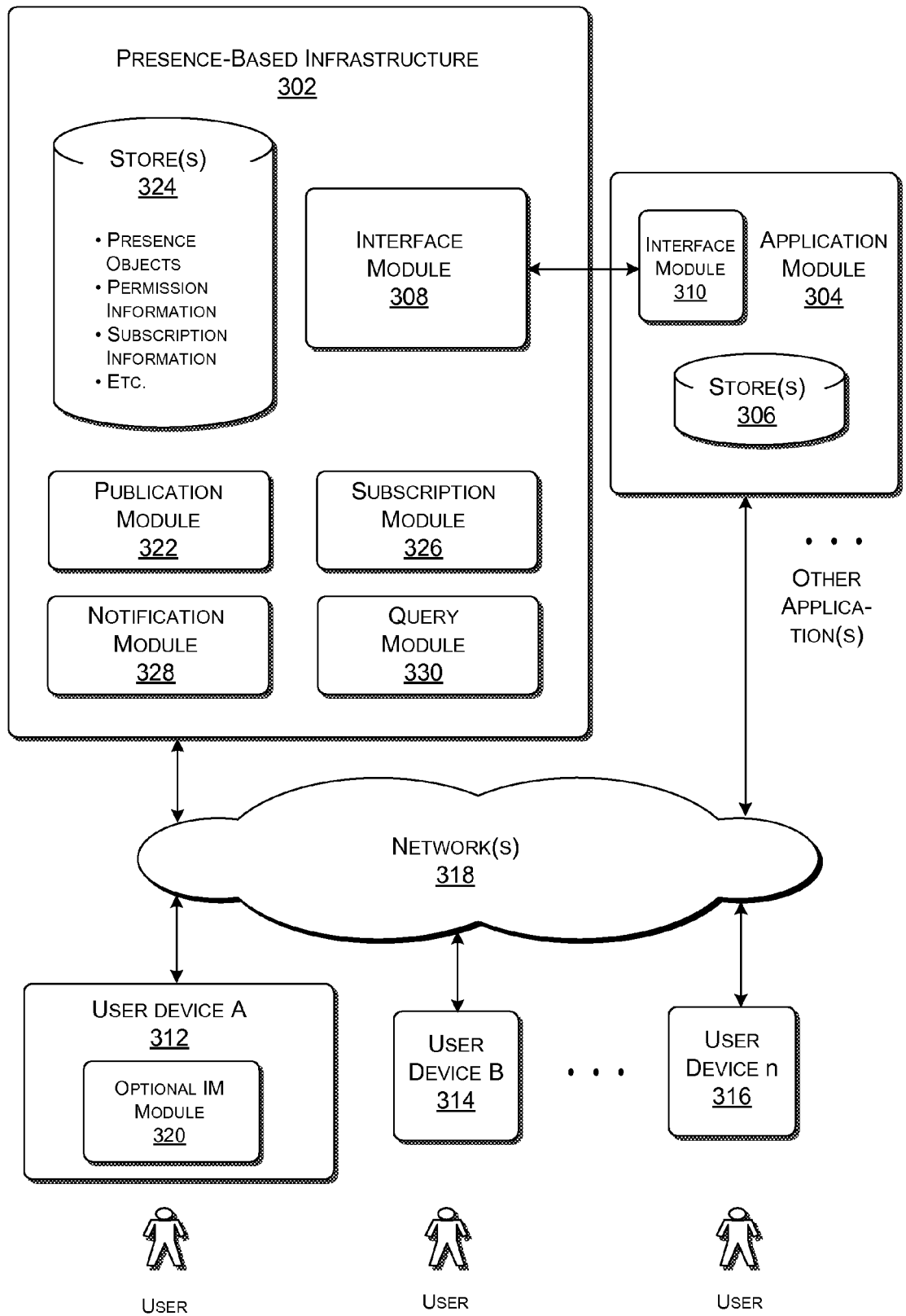
FIG. 3 shows an overview of an illustrative system for implementing the approach of FIG. 2A.

With initial reference to FIG. 3, this section describes a system 300 for implementing the principles described in Section A. The system 300 is presented for illustrative purposes; other types of systems can be used to implement the principles described above.

The system 300 uses a presence-based infrastructure 302 to manage the publication of presence data. In one case, the presence-based infrastructure 302 may correspond to infrastructure provided by an instant messaging (IM) system.

The presence data that is managed by the presence-based infrastructure 302 may originate from various sources. One or more sources may be associated with the presence-based infrastructure 302. For example, one source of presence data may correspond to an IM application that uses the presence-based infrastructure 302 to enable communication among IM participants. One or more other sources may correspond to application modules that are not formally associated with the presence-based infrastructure 302, and can therefore be considered external to the presence-based infrastructure 302. Insofar as there is a cooperative relationship between the presence-based infrastructure 302 and the application modules, these application modules can also be referred to as "partner" modules or services.

For example, FIG. 3 shows that an external application module 304 can forward presence data, permission information, and/or subscription information, etc. to the presence-based infrastructure, and rely on the presence-based infrastructure 302 to manage this information in an appropriate manner, e.g., by sending notifications to appropriate subscribers upon the occurrence of publication events. The application module 304 can include one or more stores 306 for maintaining presence data and other information. The presence-based infrastructure 302 and the external application module 304 can communicate with each other through any kind of interface mechanism, such as using interface modules (308, 310). In one illustrative and non-limiting case, the interface modules (308, 310) may implement a web services type of interface.

By virtue of the above-described arrangement, one or more external application modules can leverage a common presence-based infrastructure 302, which, as described above, may correspond to presence-based infrastructure provided by an IM system. From the perspective of the application modules, the union of services shown in FIG. 3 is efficient because it allows the application modules to provide subscription and publication functionality without independently implementing this functionality. From the perspective of the presence-based infrastructure, the union of services is beneficial because it extends the reach of the presence-based system 302 to new subscription and publication-related domains.

Any number of user devices (312, 314, 316) can interact with the presence-based infrastructure 302 and/or the application module 304 via one or more networks 318. The user devices (312, 314, 316) can correspond to any type of user devices, such as personal computers, lap top computers, personal digital assistant (PDA) devices, mobile telephone devices, game console devices, set-top box devices, and so forth. The network(s) 318 can represent a local area network (LAN), a wide area network (WAN) (e.g., the Internet), or some combination of LAN(s) and WAN(s). The network(s) 318 can be implemented by any combination of wireless links, hardwired links, routers, gateways, name servers, and so forth, and can be governed by any protocol or combination of protocols.

In one case, a user device may interact with the presence-based infrastructure 302 for the traditional purpose of exchanging IM messages with one or more other users. In this context, as represented by device 312, the device 312 may include an optional IM module 320 for interacting with the presence-based infrastructure 302. In this context, a user can utilize the functionality described above to set up multiple presence objects to selectively provide different IM presence data to different groups of contacts. In this case, all of the subscription and publication operations are implemented within the encompassing framework of the presence-based infrastructure 302.

In another case, a user can receive presence data that ultimately originates from the external application module 304. The user's device can present such presence data within the context of the IM framework. For instance, the IM module 320 of the user device 312 can present an IM interface panel that displays a list of contacts. The IM module 320 can receive notifications from the presence-based infrastructure 302 which conveys new presence data originating from the application module 304, e.g., associated with events that pertain to any of the user's contacts. The IM module 320 can present such notifications in the context of the IM interface panel (as will be described below).

In another case, a user can interact with parts of the system 302 outside the context of an IM application. For example, a user may interact with a calendar application module to perform various scheduling-related operations. The calendar application module can rely on the presence-based infrastructure 302 to manage the publication of calendar-related presence data. The system 300 can present notifications to the user within the calendar application context. These notifications may correspond to publication events associated with other users' interaction with the calendar application or other users' interaction with any other applications (such a social network application). In these scenarios, the user is not directly interacting with the IM application. Rather, the system 300 relies on the presence-based infrastructure 302 of the IM system without actually otherwise invoking traditional IM communication functions, e.g., without actually invoking a traditional IM interface panel.

FIG. 3 shows that the recipients of notifications are ultimately users associated with devices (312, 314, 316). But in other cases, one or more recipients of notifications can correspond to functionality per se of any type, such as devices, systems, etc.

With the above introduction to the system 300 as a whole, it is now possible to delve into the components of the presence-based infrastructure 302 in greater detail. FIG. 3 illustrates these components as various functional modules. In one implementation, such modules can be implemented using a collection of connection servers, presence servers, data stores, and so forth. The presence-based infrastructure 302 can be implemented at a single site or can be distributed across plural sites. The presence-based infrastructure 302 can be implemented by a single administrative entity or by a combination of entities. Certain functions of the presence-based infrastructure 302 can alternatively be implemented, in whole or in part, by one or more external application modules.

To begin with, the presence-based infrastructure 302 includes a publication module 322. The purpose of the publication module 322 is to receive presence data (and other information) from one or more sources of data in response to publication events. One or more of the sources may be internal to the presence-based infrastructure 302 (such as in the case of an IM application). One or more other sources may be external to the presence-based infrastructure 302 (such as in the case of the external application module 304). The publication module 322 can interact with external sources via the interface modules (308, 310), which may represent any mechanism, such as web service functionality. As described above, the publication events can correspond to changes in presence information, and/or alerts. More specifically, the publication module 322 is initially invoked to create a presence object, upon which it can forward a full set of presence data to subscribers. Subsequently, the publication module 322 can receive full or incremental updates from its source(s), and then send full or incremental notifications to its subscribers. The incremental notifications notify subscribers of only those parts of the presence data that have changed.

The presence data itself can be expressed in any format. In one case, the data is expressed in the extensible markup language (XML). In one case, the presence-based infrastructure 302 does not make any demands on the format of the presence data; that is, the presence-based infrastructure 302 can accept presence data in format. The presence data can include data that describes a presence state, and may also include metadata associated with the data (e.g., creation time, expiration time, etc.).

The publication module 322 can store presence data in a data store 324. The data store 324 loosely represented any way of retaining data, and may encompass a single data store or multiple different stores. The publication module 322 stores received publication data in association with one or more presence objects within the data store 324. For instance, assume that the publication module 322 is invoked to deliver notifications in the context of one or more presence objects established or otherwise associated with an entity (where the entity may correspond to a user, a group of users, a device, a functional module, a system, and so forth). Upon the occurrence of a publication event, the publication module 322 receives corresponding presence data and stores data one or more of the entity's presence objects within the store 324. For example, assume that one of the presence objects is allocated to managing presence information regarding the user's calendar-related status. If the publication module 320 receives calendar-related publication data, the publication module 320 can store this data in the corresponding calendar-related presence object.

The presence-based infrastructure 302 can store the presence data in various modes. In a first mode, the presence-based infrastructure 302 can retain the presence data in the store 324 for a predetermined amount of time. The predetermined amount of time can be specified in various ways, such by using a time to live (TTL) indicator which accompanies the presence data. In another case, the presence-based infrastructure 302 can retain certain presence data until a certain event occurs, such as when the uses logs off of a service in the system 300. In certain alterative circumstances, the presence-based infrastructure 302 can retain the presence data even though a user is no longer active (e.g., online) in the system 300.

In a second case, the presence-based infrastructure 302 can operate in a pass-through mode. In this case, the presence-based infrastructure 302 sends out notifications based on received presence data but does not otherwise persist the presence data for later use.

In a third case, the presence-based infrastructure 302 can retain presence data in an on-demand mode, wherein such presence data is obtained for the purpose of answering a query posed by a user or other entity.

The publication module 322 can also receive permission information from any source. In one case, the permission information establishes the users who are allowed to receive notifications associated with a particular presence object. The publication module 322 can store the permission information in the store 324 (or elsewhere). The permission information can be expressed in various forms, such as one or more access control lists (ACLs). The permission information can alternatively, or in addition, be expressed as authorization tickets or the like to grant temporary access to presence objects. The permission information and associated authorization strategy can assume yet other forms. In one case, for instance, the presence-based infrastructure 302 can be configured in a flexible manner to allow different partner application modules to establish different ways of performing authentication associated with the presence data that they furnish to their presence objects. As explained above, the permission information can also control what entities are permitted to write data to presence objects.

The presence-based infrastructure 302 also includes a subscription module 326. The purpose of the subscription module 326 is to receive subscription information from entities (e.g., users, applications, etc.). For example, a user may provide subscription information which defines a list of subscribers that are authorized to receive IM-related publication data. The publication module 322 can store the subscription information in the store 324 (or elsewhere).

In one case, the presence-based infrastructure 302 can retain permission information and/or subscription information only when the users associated with this information have active presence in the system 300 (e.g., when the users are online). In this case, when the users log in, permission and/or subscription information can be uploaded by appropriate information sources for storage in the presence-based infrastructure 302. In another case, the presence-based infrastructure 302 can persist permission information and/or subscription information even when users do not have an active status within the system 300 (e.g., when the users are offline).

FIG. 3 shows that the presence-based infrastructure 302 can serve as a locus for storing presence information, permission information, and subscription information. In an alternative case, the presence-based infrastructure 302 can accommodate the storage of any part of this information in one or more external stores. In this context, the presence-based infrastructure 302 can play a role in managing the information stored in such external data stores.

To cite one example, assume that a social network application generates presence data associated with changes in various photos, blogs, profile information, etc. In one case, the presence-based infrastructure 302 can store presence data which captures the content of these changes. In another case, the presence-based infrastructure 302 can minimally store timestamp information which identifies the current version of presence data maintained by the external social network application. Upon a publication event, the presence-based infrastructure 302 can notify a subscriber of the timestamp information associated with the current presence data. The subscriber can then determine whether it needs to receive an update by comparing the received timestamp information with previously received timestamp information associated with the same item. If the subscriber determines it has stale information, it can contact the social network application to obtain the current presence data, e.g., as a complete set of presence data or only the incremental part that has changed.

The presence-based infrastructure 302 can also include a notification module 328. The purpose of the notification module is to send notifications to appropriate subscribers in response to publication events. The notification module 328 can rely on permission information and subscription information to determine whether a particular recipient is authorized to receive presence data. As mentioned in the example above, the notification can include the content of new presence data and/or may contain reference information (e.g., a link) which allows the subscriber to obtain this data.

The presence-based infrastructure 302 can also include a query module 330. The query module 330 receives a query from a user (or other entity) and provides an answer to the user (or other entity). In one case, the query module 330 interacts directly with a user. In another case, a user may present his or her query to another service (e.g., the application module 304), and that service can present a query to the query module 330, and so on. In this latter type of scenario, the user may be effectively unaware of the involvement of the presence-based infrastructure 302, since the user is directly interacting with another service, not the presence-based infrastructure; the interaction with the presence-based infrastructure 302 happen on the backend by the other service.

In one case, the query module 330 can formulate its answer to the query based entirely on presence information and other information maintained by the presence-based infrastructure 302. That is, the query module 330 can formulate an answer by matching one or more terms of a query with one or more terms in the stores 324. In reporting its answer, the query module 330 is acting like the publication module 322, except that the query module 330 does not supply information in response to a persistence subscription (meaning a stored and ongoing subscription).

The query module 330 (or some other module or combination of modules) can also provide a directory service. The directory service enumerates all the presence objects that are available to a user, e.g., by providing metadata associated with the available presence objects. The directory service can be invoked by any end user and by any service, etc.

In addition to the various modules described above, the system 300 can provide configuration or set-up functionality that allows a user to set up various aspects of the system 300. In one case, the configuration functionality can enable the user to authorize (or not authorize) a source to supply presence data in various circumstances. For example, the user can authorize (or not authorize) an external source to update presence data even when the user is not logged into and/or using an application and/or service.

Figure 4:
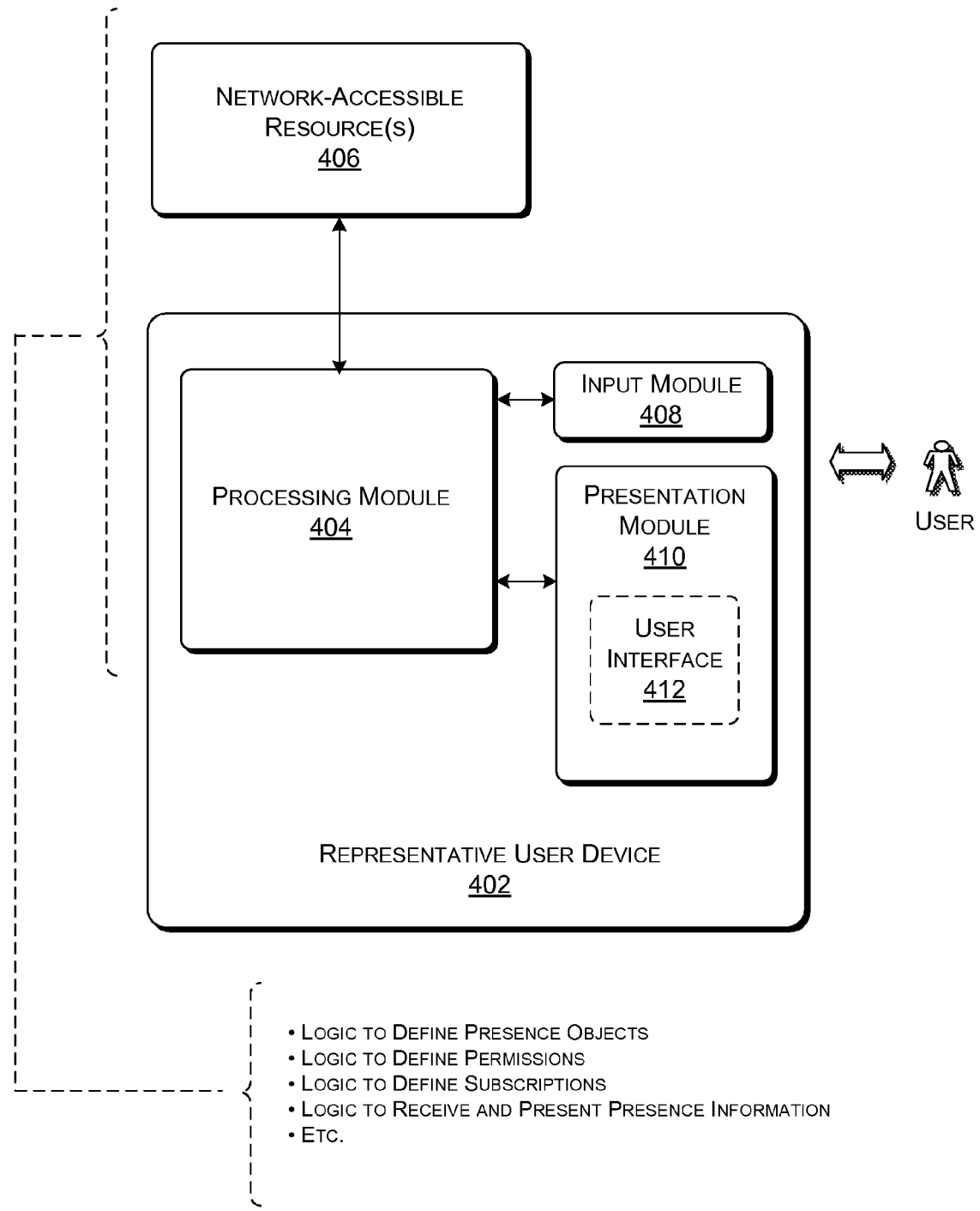
FIG. 4 shows illustrative features of the system of FIG. 3, from the perspective of a representative user device.

FIG. 4 shows the operation of the system 300 of FIG. 3 from the perspective of a representative user device 402. The representative device 402 includes a processing module 404 for carrying of various functions, in optional conjunction with functionality provided by one or more network-accessible resources 406. The network-accessible resources 406 can correspond to the presence-based infrastructure 302 and/or the application module(s) 304 of FIG. 3, and/or other network-accessible functionality. In one case, various functions are entirely implemented by the representative user device 402. In another case, various functions are entirely implemented by the one or more network-accessible resources 406. In another case, various functions are implemented by a combination of the representative user device 402 and one or more network-accessible resources 406.

In any implementation, the representative enumerated functions shown in FIG. 4 can include logic that allows a user to set up the operation of the system 300 (as it affects that user). For example, the functions can include: logic that is configured to allow a user (or other entity) to define one or more presence objects; logic that is configured to allow a user (or other entity) to define permission information; logic that is configured to allow a user (or other entity) to define subscription information, and so on. A user may engage these functions in a set-up mode when she wishes to establish (or modify) the access rights of various contacts. The functions can also include logic for receiving notifications and presenting the notifications to a user. The representative user device 402 can perform yet other functions.

The representative user device 402 can include an input module 408 for allowing a user to input information into the user device 402. The user device 402 can also include a presentation module 410 which presents information to the user. The presentation module 410, in conjunction with the processing module 404, can present a graphical user interface 412.

Figure 5:
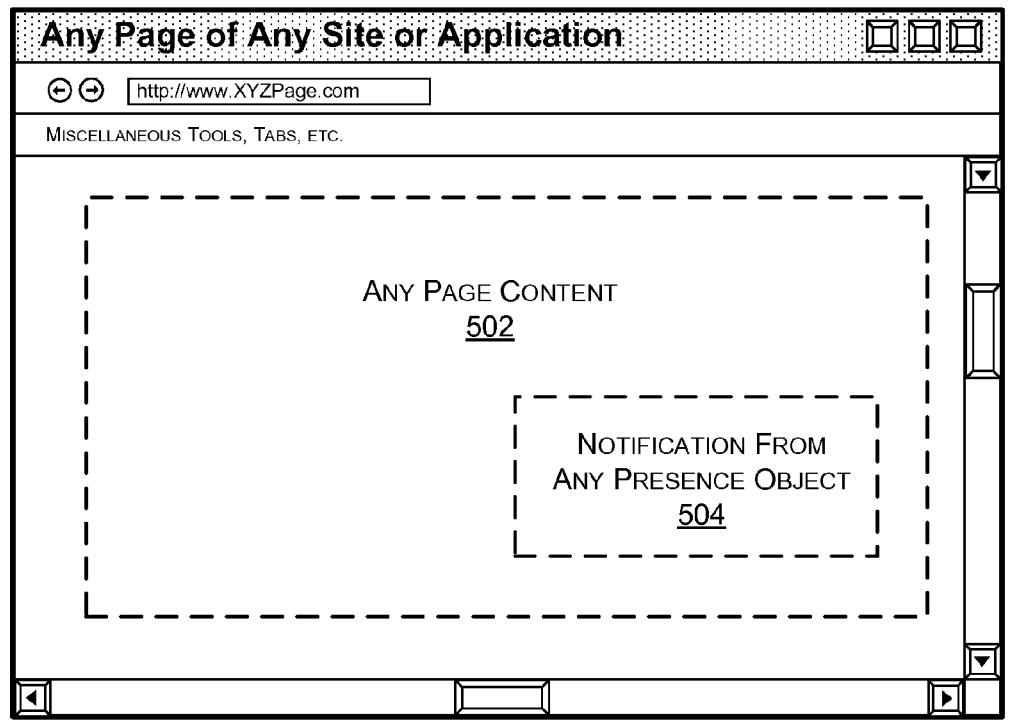
FIGS. 5 and 6 show illustrative user interface presentations that can be generated using the system of FIG. 3.

FIG. 5 shows an illustrative user interface page 502 produced by the processing module 404 and user interface 412 of FIG. 4, in optional conjunction with any network-accessible source 406. For instance, the representative user device 402 can display the page 502 when interacting with an IM application, an external application module 304, or any other network-accessible functionality. Upon receiving a notification of any type, the user device 402 can represent this notification to the user in the form of a notification message 504. As indicated in FIG. 5, the user device 402 can display the notification message 504 in the context of the user interface page 502.

Figure 6:
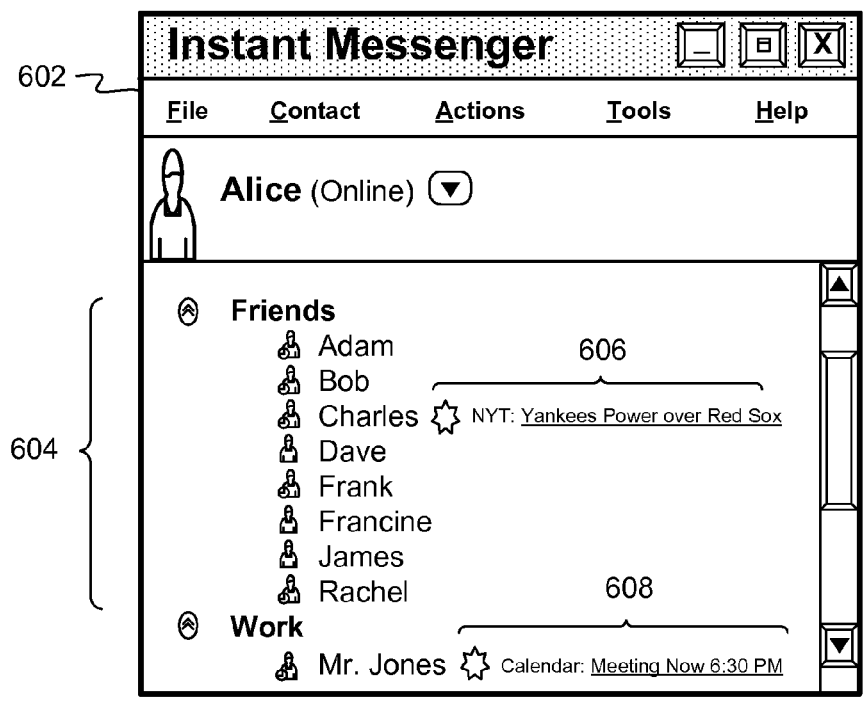

FIG. 6 shows a user interface panel 602 which corresponds to a specific instance of the user interface page 502 of FIG. 5. The panel 602 is presented by the user device 402 in the course of interacting with an IM application. The panel 602 identifies a list of contacts 604 associated with a user named Alice. In traditional fashion, the IM application can provide notifications which identify the IM status of the user's contacts, e.g., whether the users are online, busy, etc.

Charles and Mr. Jones are two of Alice's contacts. Assume that Alice subscribes to presence data associated with Charles' use of an online newspaper application. Assume that Alice subscribes to presence data associated with Mr. Jones' use of an online calendar application. In one implementation, the panel 602 can display a notification 606 regarding Charles' newspaper-related presence data and a notification 608 regarding Mr. Jones' calendar-related presence data. The notification 606 informs Alice that Charles is now reading a New York Times article entitled, "Yankees Power over Red Sox." The notification 608 informs Alice that Mr. Jones has changed a meeting to 6:30 PM.

The example of FIG. 6 is merely illustrative. In another case (not shown), Alice may be interacting with a page associated with a social network application, which has its own look and feel. Alice may receive presence-related notifications in the context of this page, where such notifications may originate from any other application module(s), including an IM application, a location-determination application, and so on. In other words, in certain cases, Alice may not directly interact with an IM application; the role of the presence-based infrastructure 304 occurs in the background in the management of subscriptions and publications.

Figure 7:
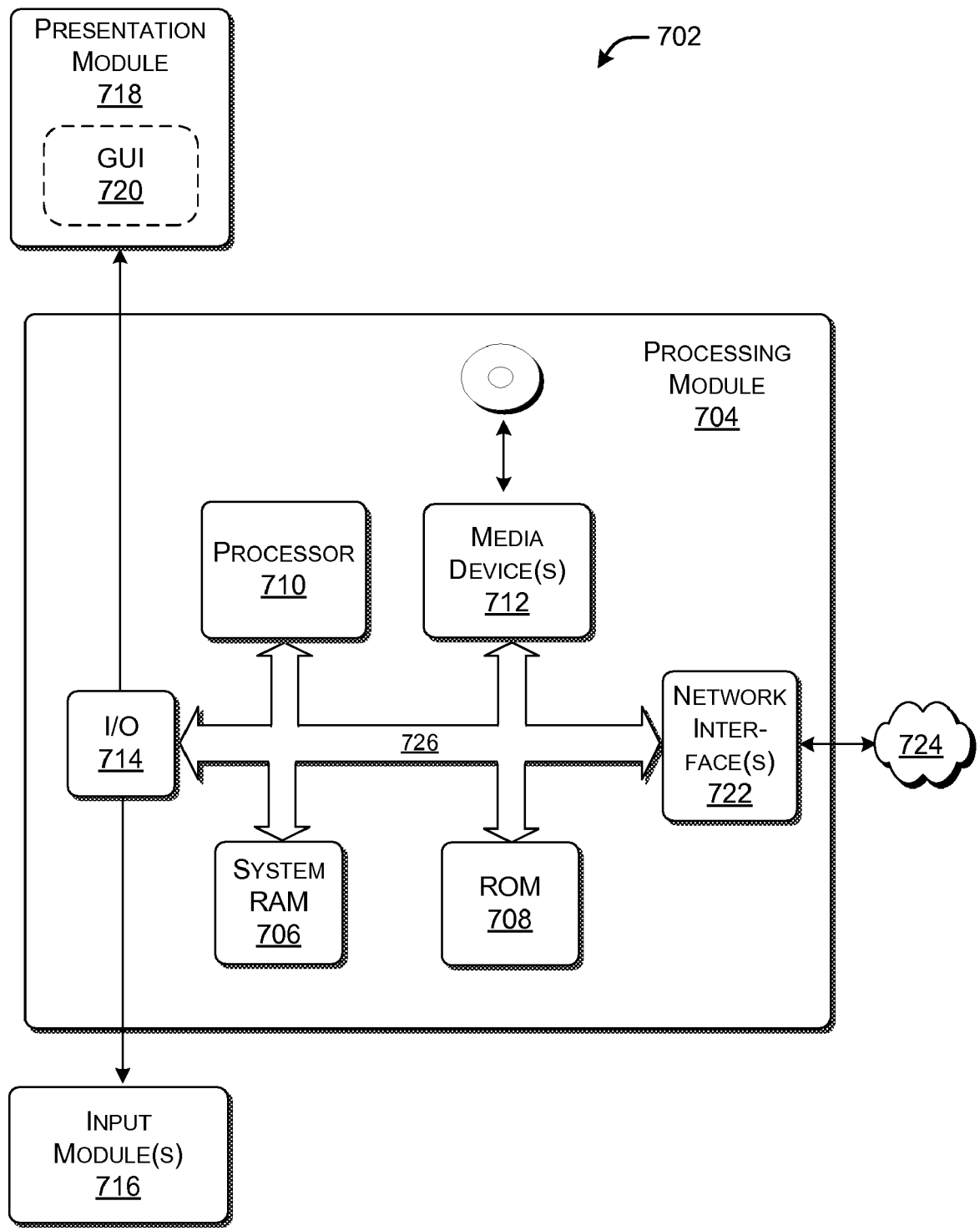
FIG. 7 shows illustrative processing functionality that can be used to implement any aspect of the system of FIG. 3.

FIG. 7 sets forth illustrative processing functionality 702 that can be used to implement any aspect of system 300 shown in FIG. 3. In one non-limiting case, for instance, the processing functionality 702 may represent any computer machine used by the system 300, e.g., to implement any aspect of a server-side computer (associated with the presence-based infrastructure 302 and/or one or more application modules), to implement any aspect of the representative user device 402, and so on.

The processing functionality 702 can include a processing module 704 for implementing various processing functions. (In the case of the representative user device 402 of FIG. 4, the processing module 404 can correspond to the processing module 704 of FIG. 7). The processing module 704 can include volatile and non-volatile memory, such as RAM 706 and ROM 708, as well as one or more processors 710. The processing functionality 702 can perform various operations identified above when the processor(s) 710 executes instructions that are maintained by memory (e.g., 706, 708, or elsewhere). The processing functionality 702 also optionally includes various media devices 712, such as a hard disk module, an optical disk module, and so forth.

The processing functionality 702 also includes an input/output module 714 for receiving various inputs from the user (via input module 716), and for providing various outputs to the user (via presentation module 718). The presentation module 718 can provide a graphical user interface (GUI) 720. (In the case of the representative user device 402 of FIG. 4, the input module 408 can correspond to the input module 716 of FIG. 7, and the presentation module 410 can correspond to the presence module 718 of FIG. 7). The processing functionality 702 can also include one or more network interfaces 722 for exchanging data with other devices and systems via one or more communication conduits 724. One or more communication buses 726 communicatively couple the above-described components together.

C. Illustrative Procedures and Applications (FIGS. 8-10)

Figure 8:
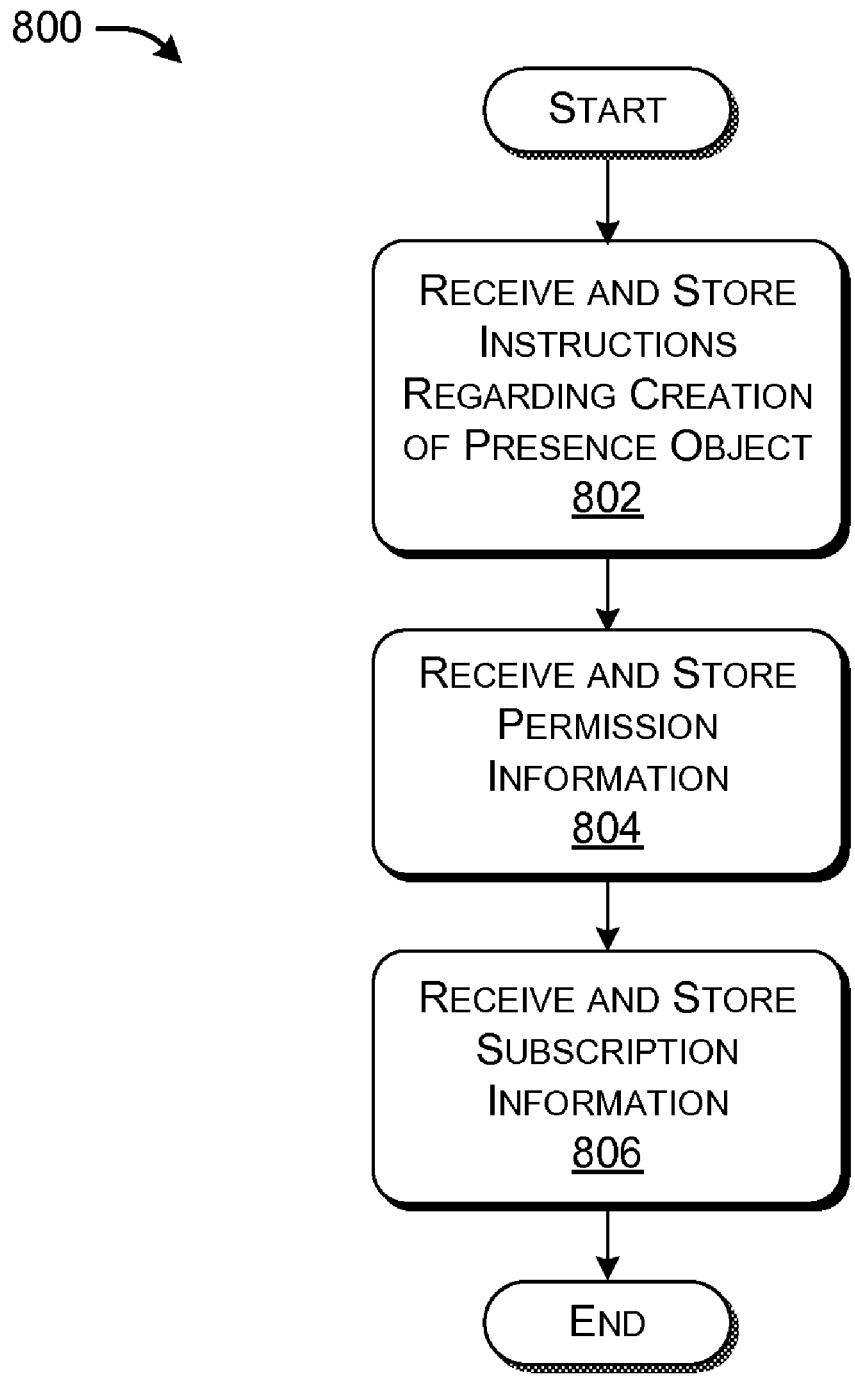
FIG. 8 is a flowchart that shows an illustrative procedure for creating a presence object and associated information.
Figure 9:
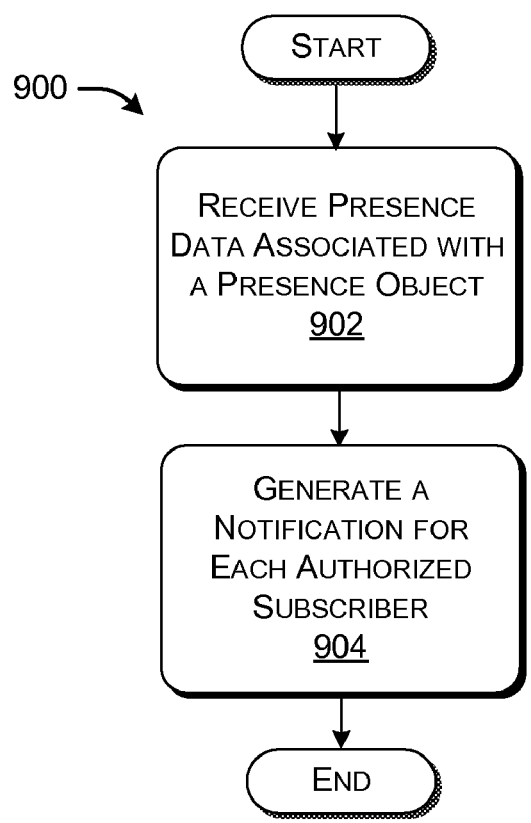
FIG. 9 is a flowchart that shows an illustrative procedure for sending a notification using a presence object.
Figure 10:
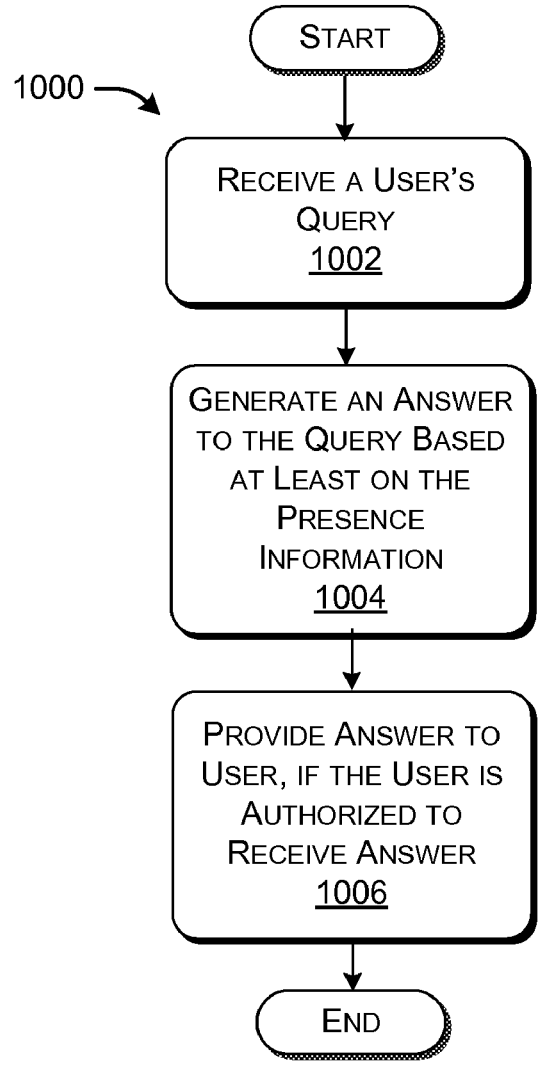
FIG. 10 is a flowchart that shows an illustrative procedure for processing a query, and for answering the query, at least in part, based on presence information.

FIGS. 8-10 describe the operation of the system 300 in flow chart form. As the functions described in the flowcharts have already been set forth in Sections A and B, FIGS. 8-10 serve principally as a review of those functions.

FIG. 8 is a flowchart that shows a procedure 800 for creating a presence object and associated information.

In block 802, the presence-based infrastructure 302 receives an entity's instructions to create a presence object. In response, the presence-based infrastructure 302 sets up an appropriate presence object.

In block 804, the presence-based infrastructure 302 receives permission information from an entity and stores this permission information.

In block 806, the presence-based infrastructure 302 receives subscription information from an entity and stores this subscription information.

FIG. 9 is a flowchart that shows a procedure 900 for generating a notification using a presence object.

In block 902, the presence-based infrastructure 302 receives presence data from one or more sources in response to a publication event. The sources may correspond to internal or external sources with respect to the presence-based infrastructure 302. The publication event may correspond to a change in presence information maintained by one or more sources, and so on. Assume that the presence data pertains to a particular presence object, having appropriate permission information and subscription information associated therewith.

In block 904, the presence-based infrastructure 302 consults permission information and subscription information to determine the subscribers that should be notified of the received presence data. The presence-based infrastructure 302 then sends notifications to the appropriate subscribers.

FIG. 10 is a flowchart that shows a procedure 1000 for processing a query made by a user or other entity.

In block 1002, the presence-based infrastructure 302 receives a user's query (or a query from some other entity).

In block 1004, the presence-based infrastructure 302 generates an answer to the query based, in part, on presence information maintained by the presence-based infrastructure 702 and/or elsewhere. Depending on the nature of the query, the presence-based infrastructure 702 may also consult one or more external application modules to answer the query.

In block 1006, the presence-based infrastructure 302 provides the answer to the user (or other entity) that made the query.

The system 300 shown in FIG. 3 has numerous applications. The remaining portions of this disclosure describe a few illustrative scenarios of the system 300.

Social Network Scenario

In one scenario, assume that a user, Jill, creates plural presence objects associated with information maintained on a social network application module. Namely, Jill can maintain separate presence objects for profile information, photos, and blogs, respectively. Assume that Jill's friend, Sue, selectively subscribes to one or more of these social network presence objects. When a change is made to any of these objects, the social network application sends presence data to the presence-based infrastructure 302, asking the infrastructure 302 to publish this data to Sue and other subscribers. The presence-based infrastructure 302 responds by sending out notifications to subscribers. These notifications can include the content of the changes or links to the content. Alternatively, or in addition, a notification can include timestamp information associated with current present data. Sue's user device can decide whether it has the most current version by comparing the newly received timestamp information with previously stored timestamp information associated with Jill's presence information. If there is a difference, Sue's user device can retrieve the new presence data.

Mapping-Related Scenario

In another scenario, a wireless carrier service or GPS-equipped service may determine the location of a user named Bob. This service can feed such location information as presence data to a location-related presence object associated with Bob. Further assume that Bob has authorized several application modules and users to access his geographic location via this presence object. For example, since Bob wants all of his family members to always receive his real-time location, he adds his family members to an explicit allow list for his location data. Since Paul is also Bob's close friend, Bob allows Paul to have limited access to his location information. In this case, whenever Paul wants to get Bob's location, he can request an authorization ticket. This ticket can be presented to the presence-based infrastructure 302 to obtain Bob's location. In another application, Paul can access a mapping-related service to determine, at a particular point in time, the closest coffee shop to both Paul and Bob. The mapping-related service can access Bob's presence object to obtain Bob's location, combine it with Paul's location, and based on this combined data, determine a nearby coffee shop.

Merchandising-Related Scenario

In one scenario, Frank can establish a presence object that includes information regarding an item that Frank wishes to sell through a merchant-related application (or an item which Frank is seeking to purchase through this application). Frank can authorize various subscribers to receive notifications regarding his presence object. The notifications can include an appropriate link (e.g., an URL) which directs interested users to the merchant-related application.

Calendar-Related Scenario

In another scenario, Arnold creates a presence object that conveys calendar information (regarding his schedule) to identified subscribers. For example, Arnold may selectively authorize a subset of his instant messaging contacts to view his calendar information. The calendar application will invoke a publication event any time something changes in Arnold's calendar information. The publication event will prompt the presence-related infrastructure 304 to send notifications to authorized subscribers.

In another case, assume that the calendar service also creates a presence object that specifically pertains to a concert series. A fan, Dan, can add this calendar-related presence object as a contact in an instant messaging application. Whenever there are changes or new information for the concert series, the calendar service can publish new timestamp information to be stored in the concert-related presence object. This event, in turn, will prompt the presence-related infrastructure 304 to fan out appropriate notifications to all subscribers, including Dan. Dan's user device can compare the timestamp information in the notification with timestamp information associated with previously received calendar information. If Dan's device determines that the current timestamp information corresponds to new information, it can contact the calendar service to retrieve updated calendar information.

Game-Related Scenario

In another scenario, a network-accessible gaming application can create its own presence object to store gaming-specific presence data. Such data can include game status data, player identification data, score data, game event data, etc. Whenever a player signs-in to this game application, the service can upload his game permission information (e.g., ACLs) and publish current game information to the game-related presence object maintained by the presence-related infrastructure 302. Then, as game updates occur, the game application in conjunction with the presence-related infrastructure 302 can fan appropriate notifications out to authorized subscribers. The game application also has the ability to specify the longevity of presence data associated with updates. This governs how long the presence-based infrastructure 302 retains the presence data. For instance, in one case, the game application can provide instructions that allow updates to be cached. In another case, the game application can provide instructions that allow updates to be retained for a predetermined amount of time, and then deleted. In another case, the game application can provide instructions that allow updates to directly pass through to subscribers without being stored. This last-mentioned mode may be appropriate for notifications regarding certain real-time events in the course of game play.

In closing, a number of features were described herein by first identifying illustrative problems that these features can address. This manner of explication does not constitute an admission that others have appreciated and/or articulated the problems in the manner specified herein. Appreciation and articulation of the problems present in the relevant art(s) is to be understood as part of the present invention.

More generally, although the invention has been described in language specific to structural features and/or methodological acts, it is to be understood that the invention defined in the appended claims is not necessarily limited to the specific features or acts described. Rather, the specific features and acts are disclosed as illustrative forms of implementing the claimed invention.

What is claimed is:

1. A method comprising:
   under control of one or more processors configured with processor-executable instructions,
   receiving a first presence data from a first presence information source, the first presence data including a first presence information describing a first presence relating to an entity in a context of the first presence information source;
   receiving a second presence data from a second presence information source, the second presence data including a second presence information describing a second presence relating to the entity in a context of the second presence information source;
   storing the first presence data in a first presence object and the second presence data in a second presence object;
   storing a respective permission information and a respective subscription information in a respective presence object from the first presence object and the second presence object, the respective permission information identifying one or more users who are entitled to receive the respective presence information from the respective presence object, the respective subscriber information identifying one or more subscribers that subscribe to receive the respective presence information from the respective presence object;

allocating the respective presence object to administer distribution of a respective presence data; and conveying the respective presence information of the entity to one or more authorized subscribers based on a comparison of the respective permission information and the respective subscriber information of the respective presence object.

2. The method of claim 1, further comprising maintaining the respective presence data, via the respective presence object, when the entity is disengaged from the respective presence information source.

3. The method of claim 1, wherein the respective presence data describes at least one characteristic of the entity's presence in a context of the respective presence information source.

4. The method of claim 1, wherein the first presence information source and the second presence information source are selected from a group comprising: an instant messaging application, a social network application, a gaming application, a media consumption application, a calendar application, and a geographical location application.

5. The method of claim 1, further comprising comparing the respective permission information and the respective subscriber information to automatically determine the one or more authorized subscribers.

6. The method of claim 1, wherein the entity, the respective presence information source and the respective presence object are related by a hierarchical structure.

7. The method of claim 1, wherein the first presence information source is unrelated to the second presence information source.

8. The method of claim 1, wherein the one or more subscribers are associated with the respective presence object.

9. The method of claim 1, wherein the one or more subscribers are listed in both a permission list generated by the entity and one or more subscribers lists generated by the one or more subscribers.

10. The method of claim 1, wherein the conveying comprises conveys information associated with the first presence data to one or more authorized subscribers who are authorized to receive the information associated with the first presence data and conveying information associated with the second presence data to one or more authorized subscribers who are authorized to receive the information associated with the second presence data.

11. The method of claim 1, further comprising comparing the first presence data from the first presence information source with the second presence data from the second presence information source in response to a received query.

12. The method of claim 1, wherein a presence-based infrastructure of an instant messaging system manages at least one or more of publications, subscriptions, and notifications associated with the respective presence object.

13. The method of claim 12, wherein the first presence information source is external to the presence-based infrastructure of the instant messaging system.

14. A system for a presence-based infrastructure comprising:
one or more processors; and
memory having stored thereon processor-executable modules that are executable by the one or more processors, the processor-executable modules comprising:
a store that stores a plurality of presence data associated with an entity in a plurality of presence objects, the plurality of presence data originated from a plurality of presence information sources, each of the plurality of presence data including a respective presence information describing a presence relating to the entity in a context of a respective presence information source, and stores a respective permission information and a respective subscription information in a respective presence object, the respective permission information identifying one or more users who are entitled to receive the respective presence information from the respective presence object, the respective subscriber information identifying one or more subscribers that subscribe to receive the respective presence information from the respective presence object;
a subscription module that receives the respective subscription information;
a publication module that receives publication data including at least a portion of the respective presence information from the respective presence object in response to a publication event, saves the publication data associated with the respective presence object in the store, and publishes the publish data; and
a notification module that sends a notification to the at least one subscriber in response to the publication event if the at least one subscriber is an authorized subscriber based on a comparison of the respective permission information to the respective subscription information from the respective presence object.

15. The system of claim 14, wherein the presence-based infrastructure further includes a query module that processes a query associated with the presence information.

16. The method of claim 14, wherein the presence-based infrastructure is part of an instant messaging system and the at least one presence information source is different from the instant messaging system.

17. One or more memories having stored thereon processor-executable instructions that are executable by the one or more processors to perform actions comprising:
receiving a first presence data from a first presence information source, the first presence data including a first presence information describing a first presence relating to an entity in a context of the first presence information source;
receiving a second presence data from a second presence information source, the second presence data including a second presence information describing a second presence relating to the entity in a context of the second presence information source;
storing the first presence data in a first presence object and the second presence data in a second presence object;
storing a respective permission information and a respective subscription information in a respective presence object from the first presence object and the second presence object, the respective permission information identifying one or more users who are entitled to receive the respective presence information from the respective presence object, the respective subscriber information identifying one or more subscribers that subscribe to receive the respective presence information from the respective presence object;
allocating the respective presence object to administer distribution of a respective presence data; and
conveying the respective presence information of the entity to one or more authorized subscribers based on a comparison of the respective permission information and the respective subscriber information of the respective presence object.

18. The one or more memories of claim 17, further comprising maintaining the respective presence data, via the respective presence object, when the entity is disengaged from the respective presence information source.

19. The one or more memories of claim 17, wherein the respective presence data describes at least one characteristic of the entity's presence in a context of the respective presence information source.

20. The one or more memories of claim 17, wherein the first presence information source and the second presence information source are selected from a group comprising: an instant messaging application, a social network application, a gaming application, a media consumption application, a calendar application, and a geographical location application.

* * * * *